United States Patent
Hayashi (10) Patent No.: US 9,610,918 B2
(45) Date of Patent: Apr. 4, 2017

(54) SEATBELT DEVICE BEZEL

(71) Applicant: TOYOTA JIDOSHA KABUSHIKI KAISHA, Toyota-shi, Aichi-ken (JP)

(72) Inventor: Hiroaki Hayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/933,782

(22) Filed: Nov. 5, 2015

(65) Prior Publication Data

US 2016/0137159 A1 May 19, 2016

(30) Foreign Application Priority Data

Nov. 14, 2014 (JP) ................................. 2014-231661

(51) Int. Cl.
*B60R 22/18* (2006.01)

(52) U.S. Cl.
CPC ...... *B60R 22/18* (2013.01); *B60R 2022/1818* (2013.01); *B60R 2022/1831* (2013.01)

(58) Field of Classification Search
CPC . B60R 22/18; B60R 2022/1818; B60R 22/00; B60R 22/1831
USPC ............................................. 297/463.1, 482
See application file for complete search history.

(56) References Cited

U.S. PATENT DOCUMENTS

| 5,716,073 A | * | 2/1998 | Redman | ................. B60R 22/26 280/801.1 |
| 2007/0187939 A1 | * | 8/2007 | Latour | ................... B60R 22/18 280/808 |

FOREIGN PATENT DOCUMENTS

| DE | 3022005 A1 | * | 12/1981 | ............... B60N 2/00 |
| JP | 2003-127828 A | | 5/2003 | |
| JP | 2009-166639 A | | 7/2009 | |
| JP | 2011131843 A | * | 7/2011 | |
| JP | 2012-218687 A | | 11/2012 | |
| JP | 2014-218157 A | | 11/2014 | |

* cited by examiner

*Primary Examiner* — Milton Nelson, Jr.
(74) *Attorney, Agent, or Firm* — Oliff PLC (57) ABSTRACT

A seatbelt device bezel includes: a communication opening path that is in communication with a webbing pass-through portion of a bezel main body and that extends along a direction intersecting the webbing pass-through portion and opens at an outer edge of the bezel main body; a main body receiving portion that is disposed on both width direction sides of the communication opening path and that is integrally formed to the bezel main body; and a closing member that is mounted to the communication opening path and closes off the communication opening path, and that includes a clamping portion that clamps the main body receiving portion from one side and another side in the webbing pass-through direction.

8 Claims, 7 Drawing Sheets

SEATBELT DEVICE BEZEL

CROSS-REFERENCE TO RELATED APPLICATION

This application is based on and claims priority under 35 USC 119 from Japanese Patent Application No. 2014-231661 filed on Nov. 14, 2014, the disclosure of which is incorporated by reference herein.

TECHNICAL FIELD

The present invention relates to a seatbelt device bezel configuring a portion of a vehicle seatbelt device.

RELATED ART

A cover member through which webbing of a seatbelt device is inserted is provided at an outlet of the webbing, and the webbing is suppressed from being wound onto a retractor in a state in which a width direction intermediate portion of the webbing is folded or twisted. Japanese Patent Application Laid-Open (JP-A) No. 2012-218687 describes, for example, a bezel formed with a slit-shaped webbing pass-through portion.

However, the bezel needs to have an opening portion that is in communication with the webbing pass-through portion in order to insert the webbing through the webbing pass-through portion during assembly. Japanese Patent Application Laid-Open (JP-A) No. 2012-218687 describes a closing tab that closes off the opening portion after the webbing has been inserted through. In cases in which the bezel is configured by two or more components in this manner, the webbing pass-through portion is liable to widen due to deformation of a coupling portion of the components. There is accordingly a demand to strengthen the coupling portion of the components in order to prevent the webbing passing through the webbing pass-through portion of the bezel in a folded state.

SUMMARY

In consideration of the above circumstances, an object of the present invention is to obtain a seatbelt device bezel capable of preventing or suppressing webbing from passing through a webbing pass-through portion in a folded state.

A seatbelt device bezel according to a first aspect of the present invention includes: a bezel main body that is formed with a slit-shaped webbing pass-through portion through which webbing of a seatbelt device is passed; a communication opening path that is formed at the bezel main body, that is in communication with the webbing pass-through portion, and that extends along a direction intersecting the webbing pass-through portion and opens at an outer edge of the bezel main body; a main body receiving portion that is disposed at both width direction sides of the communication opening path and that is integrally formed with the bezel main body; and a closing member that is mounted at the communication opening path and closes off the communication opening path, and that includes a clamping portion that clamps the main body receiving portion from one side and from another side in the webbing pass-through direction.

In the seatbelt device bezel according to the first aspect, the webbing can be inserted through the webbing pass-through portion through the communication opening path of the bezel main body. The communication opening path is closed off by the closing member after the webbing has been inserted through the webbing pass-through portion. When this is performed, the closing member and the clamping portion clamp the main body receiving portion integrally formed to the bezel main body from the one side and the other side in the webbing pass-through direction, such that the coupling portion between the closing member and the bezel main body has increased rigidity in the webbing pass-through direction. The webbing pass-through portion is thereby less liable to widen, even when the webbing attempts to pass through the webbing pass-through portion in a folded state and load is applied to the webbing pass-through portion.

In the seatbelt device bezel according to a second aspect of the present invention, the clamping portion includes a clamping protrusion portion having a shape that protrude in the webbing pass-through direction, and the main body receiving portion includes a main body recessed portion into which the clamping protrusion portion is fitted.

In the seatbelt device bezel according to the second aspect, the clamping protrusion portion is fitted into the main body recessed portion, such that the clamping portion and the main body receiving portion are restricted from movement relative to each other in the direction intersecting the webbing pass-through direction. This enables the webbing pass-through portion to be suppressed from widening due to relative movement of the closing member and the bezel main body.

In a seatbelt device bezel of a third aspect according to the present invention, the one side and the other side of the clamping portion are coupled together by a coupling portion disposed in the communication opening path.

In the seatbelt device bezel according to the third aspect, forming the coupling portion enables the rigidity of the closing member to be increased, such that the webbing pass-through portion is less liable to widen, even when load is applied to the webbing pass-through portion.

In a seatbelt device bezel according to a fourth aspect of the present invention, the closing member is movable from the outer edge of the bezel main body along the extension direction of the communication opening path.

In the seatbelt device bezel according to the fourth aspect, the closing member can be moved from the outer edge of the bezel main body along the extension direction of the communication opening path, and can be easily attached to the bezel main body.

In a seatbelt device bezel according to a fifth aspect of the present invention, in an attached state of the closing member to the bezel main body, the closing member is abutted from the opening side of the communication opening path by a retainer that retains the bezel main body, and the closing member is clamped between the retainer and the bezel main body.

In the seatbelt device bezel according to the fifth aspect, the bezel main body is retained by the retainer. When this is performed, the closing member is abutted from the opening side of the communication opening path by the retainer, and the closing member is clamped between the retainer and the bezel main body.

ADVANTAGEOUS EFFECTS OF INVENTION

The seatbelt device bezel according to the first aspect of the present invention enables the webbing to be prevented or suppressed from passing through the webbing pass-through portion in a folded state.

The seatbelt device bezel according to the second or third aspect of the present invention enables the webbing to be prevented or further suppressed from passing through the webbing pass-through portion in a folded state.

The seatbelt device bezel according to the fourth aspect of the present invention enables increased ease of assembly of the seatbelt device bezel.

The seatbelt device bezel according to the fifth aspect of the present invention enables the closing member to be prevented or suppressed from detaching from the bezel main body.

BRIEF DESCRIPTION OF THE DRAWINGS

Embodiments of the present invention will be described in detail based on the following figures, wherein.

DETAILED DESCRIPTION OF THE INVENTION

Figure 1:
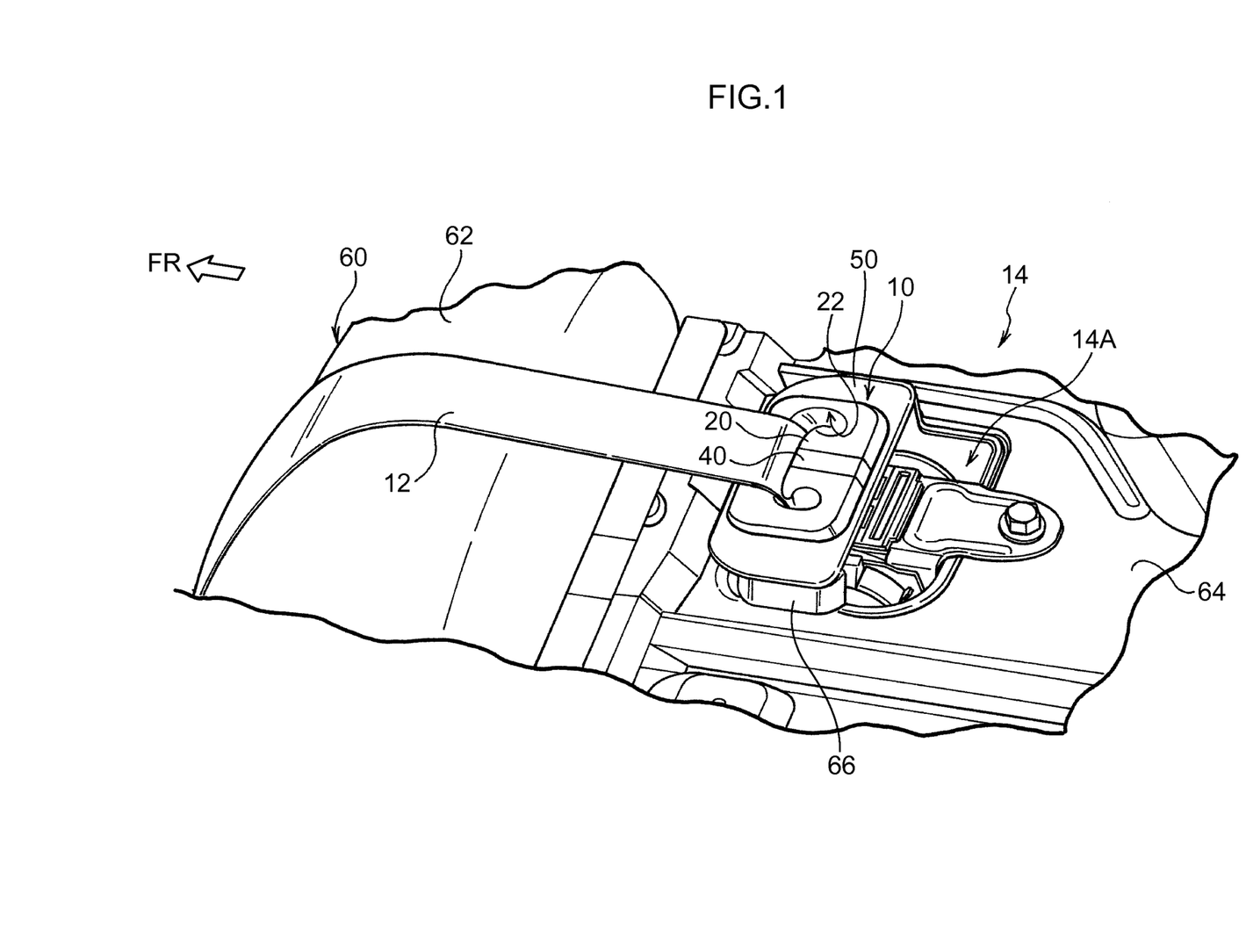
FIG. 1 is a perspective view illustrating a configuration of the rear of a rear seat of a vehicle mounted with a seatbelt device according to an exemplary embodiment of the present invention.

As illustrated in FIG. 1, a seatbelt device bezel 10 (hereafter simply referred to as "bezel 10") according to an exemplary embodiment is employed in a seatbelt device 14 for a rear seat 60 of a vehicle. The seatbelt device 14 includes webbing 12 and a retractor 14A. The webbing 12 has an elongated belt shape, and one length direction end side thereof passes an upper end portion of a seatback 62 configuring the rear seat 60, and extends downward along a front face of the seatback 62. The webbing 12 passes through a gap between the seatback 62 and a seat cushion (not illustrated in the drawings), and is fixed to a frame member of the rear seat 60, or the vehicle body, etc.

A tongue (not illustrated in the drawings) is provided to the webbing 12 at the front face side of the seatback 62, and the tongue is fastened to a buckle (not illustrated in the drawings) fixed to the vehicle body or a frame of the rear seat 60.

The retractor 14A is fixed to an upper shell 64 at the rear of the rear seat 60. The retractor 14A includes a spool, the other end portion of the webbing 12 is anchored to the spool, and the webbing 12 is wound onto the spool. A stand 66 is provided to the upper shell 64, and a retainer 50 is fixed to the stand 66. The bezel 10 is attached to the retainer 50. The webbing 12 is pulled out from a webbing pass-through portion 22, described later, of the bezel 10 toward a vehicle cabin side.

Figure 2:
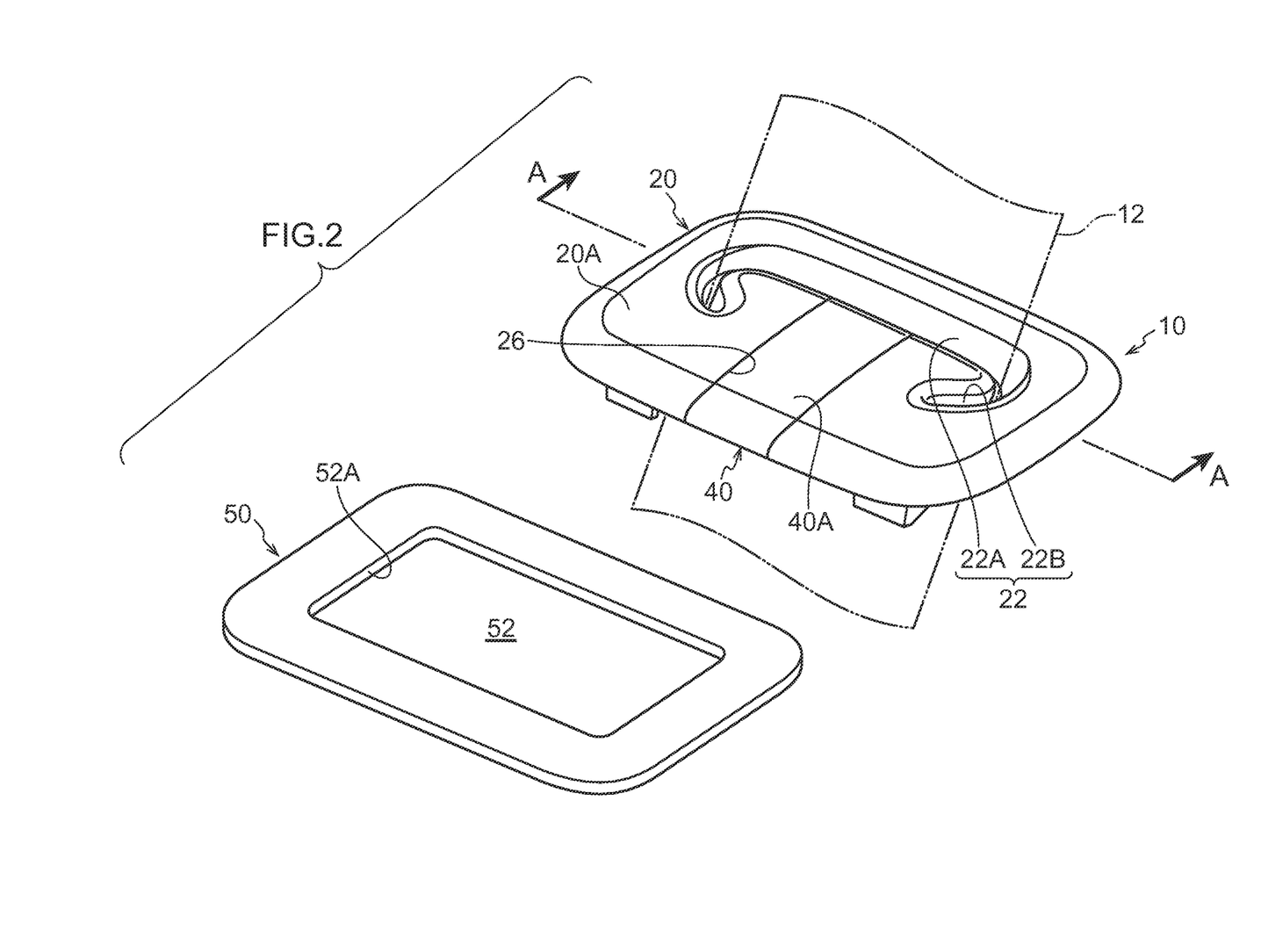
FIG. 2 is a perspective view of a seatbelt device bezel according to an exemplary embodiment of the present invention, and a retainer.
Figure 3:
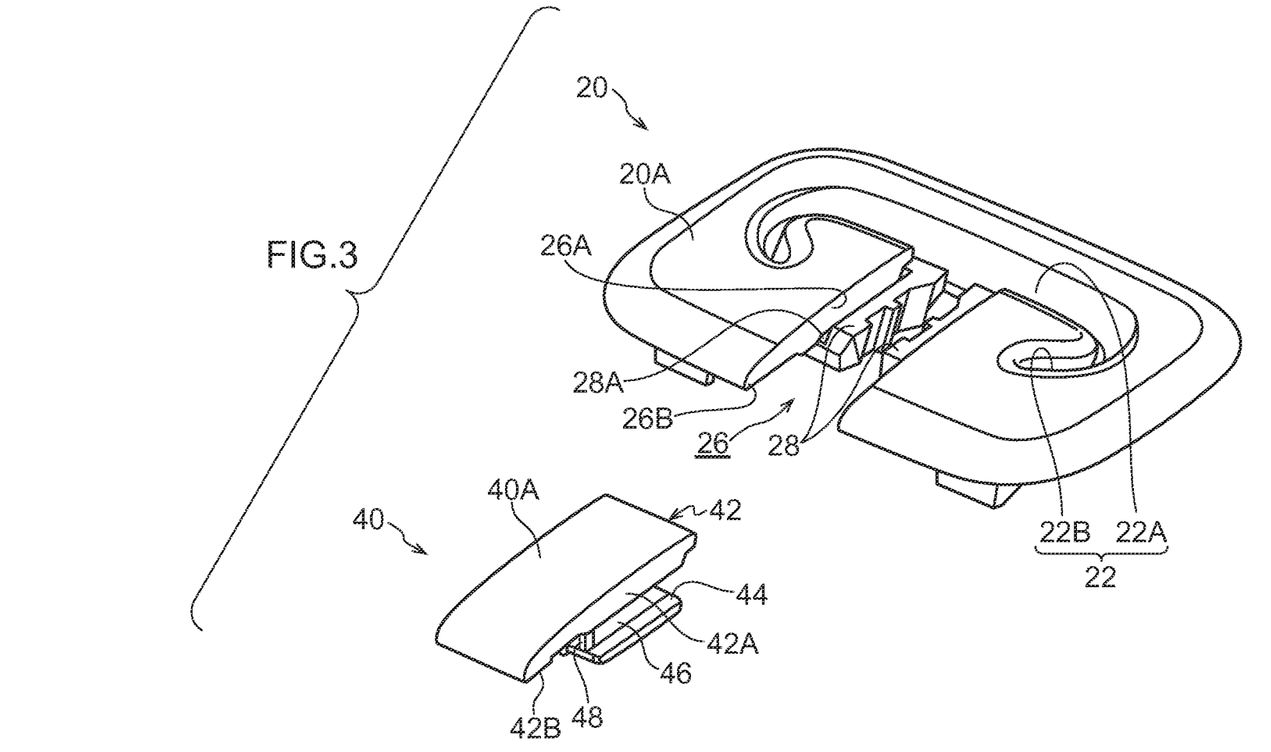
FIG. 3 is a perspective view of a state in which a closing member is detached from a bezel main body of a seatbelt device bezel according to an exemplary embodiment of the present invention, viewed from a front face side.

As illustrated in FIG. 2, the bezel 10 includes a bezel main body 20 and a closing member 40. As illustrated in FIG. 3, the bezel main body 20 has a substantially elongated flat plate shape in plan view. The webbing pass-through portion 22 that allows insertion of the webbing 12 is formed piercing through the plate thickness direction of the bezel main body 20. The webbing pass-through portion 22 is formed in a slit shape along the length direction of the bezel main body 20, and both ends thereof curve so as to loop back toward the length direction center side. A portion running along the length direction of the webbing pass-through portion 22 is hereafter referred to as a "main pass-through portion 22A", and the looped portions are hereafter referred to as "looped portions 22B". Portions of a front face 20A of the bezel main body 20 other than the webbing pass-through portion 22 have a substantially flattened profile.

Figure 4:
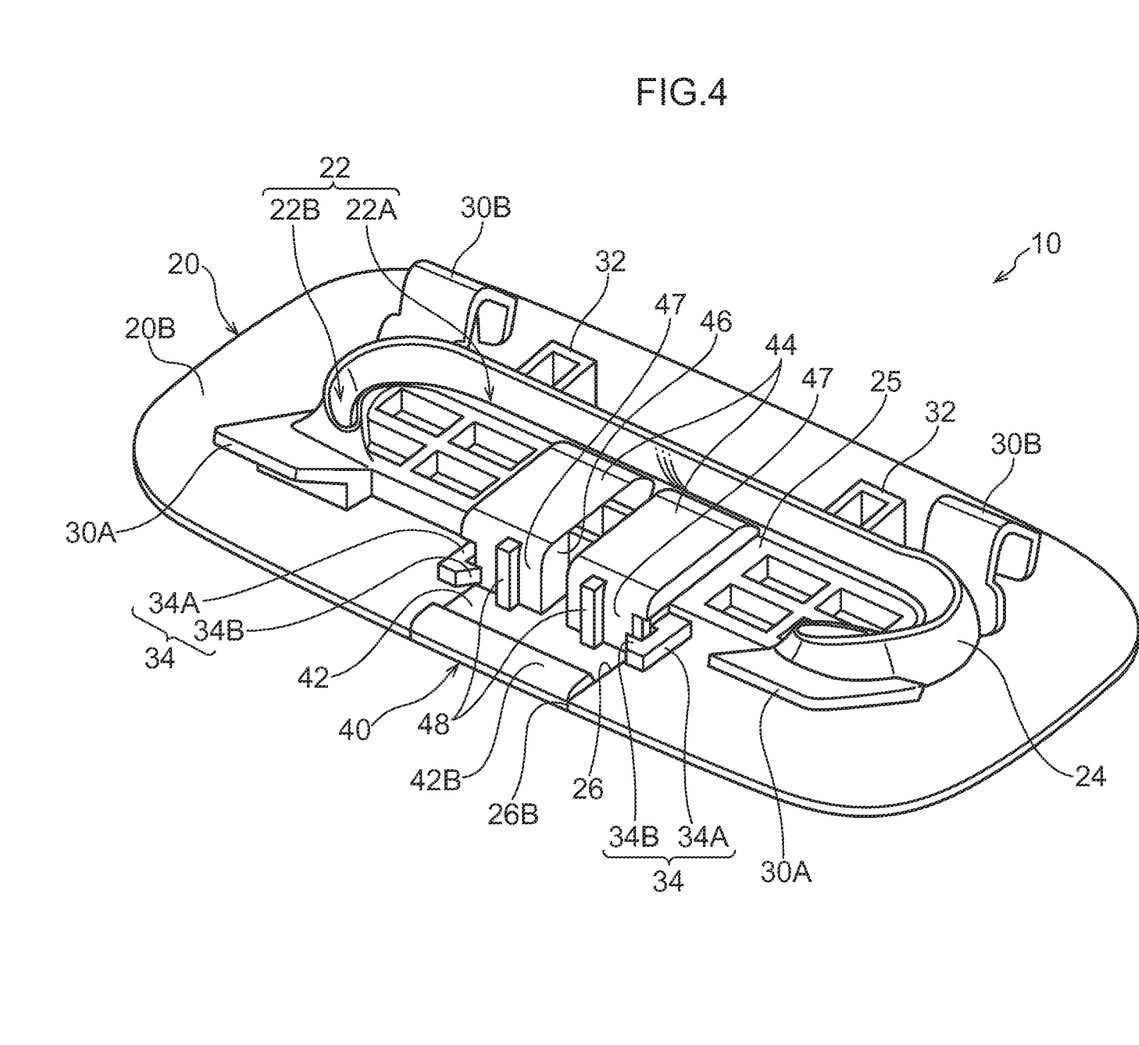
FIG. 4 is a perspective view of a seatbelt device bezel according to an exemplary embodiment of the present invention, viewed from a back side.

As illustrated in FIG. 4, a guide rib 24 is formed to a back face 20B of the bezel main body 20 at an outer peripheral portion of the webbing pass-through portion 22. The guide rib 24 projects out from the back face 20B of the bezel main body 20, and has a portion corresponding to the main pass-through portion 22A that slopes toward the main pass-through portion 22A side, and portions corresponding to the looped portions 22B that slope toward the inside of the loops.

A communication opening path 26 is formed to the bezel main body 20. The communication opening path 26 is a cutout portion extending from a length direction intermediate portion of the webbing pass-through portion 22 toward an outer edge of the bezel main body 20 in a direction orthogonal to the webbing pass-through portion 22. In plan view, the webbing pass-through portion 22 is open toward the outside of the bezel main body 20 through the communication opening path 26. A portion at the opening end is hereafter referred to as an "opening end portion 26B".

As illustrated in FIG. 3, walls 26A are formed at both width direction sides of the communication opening path 26 of the bezel main body 20. A main body receiving portion 28 is formed to each wall 26A. The main body receiving portion 28 projects out from the wall 26A toward the communication opening path 26, and is formed in a direction running along the communication opening path 26 from further toward the back side than the opening end portion 26B to as far as a boundary portion with the main pass-through portion 22A. A main body recessed portion 28A with a base end portion (a boundary portion with the wall 26A) running along the communication opening path 26 is formed to the main body receiving portion 28. The main body recessed portion 28A is formed in a groove shape with a recess at the front face 20A side, opens along the extension direction of the communication opening path 26 at the opening end portion 26B side, and neither opens nor communicates with the main pass-through portion 22A at an end portion at the main pass-through portion 22A side. Namely, the end portion of the main body recessed portion 28A at the main pass-through portion 22A side terminates further to the front side than the main pass-through portion 22A.

As illustrated in FIG. 4, a pair of engaging tabs 30A and a pair of engaging hook portions 30B are each formed at the back face 20B of the bezel main body 20. The engaging tabs 30A project out from the outside of the guide rib 24 at the opposite side of the looped portions 22B to the main pass-through portion 22A, and form flat plate shapes sloping toward the opening end portion 26B side. The engaging hook portions 30B are formed at the outside of the guide rib 24 at the opposite side of both ends of the main pass-through portion 22A to the looped portions 22B, and are formed in hook shapes that bend toward the opposite side to the main pass-through portion 22A and are capable of resilient deformation. Base end portions of the engaging tabs 30A engage with an inner wall 52A of the retainer 50, described later. The engaging hook portions 30B are resiliently engaged with the inner wall 52A of the retainer 50.

A pair of reinforcing ribs 32 are formed between the pair of engaging hook portions 30B. The reinforcing ribs 32 are fixed to an outside face of the guide rib 24 and reinforce the guide rib 24.

Inside guide ribs 25 are formed to the back face 20B of the bezel main body 20 at the inside of the guide rib 24, and are surrounded by the guide rib 24. The inside guide ribs 25 have a lower projection height than the guide rib 24, and have one end side formed along the webbing pass-through portion 22.

A pair of restricting members 34 are formed to the back face 20B of the bezel main body 20 at positions running along the communication opening path 26. Each restricting member 34 includes a main body portion 34A, and a hook portion 34B formed at one end of the main body portion 34A. The hook portions 34B of the restricting members 34 face each other and project out toward the communication opening path 26, and the hook portions 34B are disposed further toward the opening end portion 26B side than the main body portions 34A.

Figure 5:
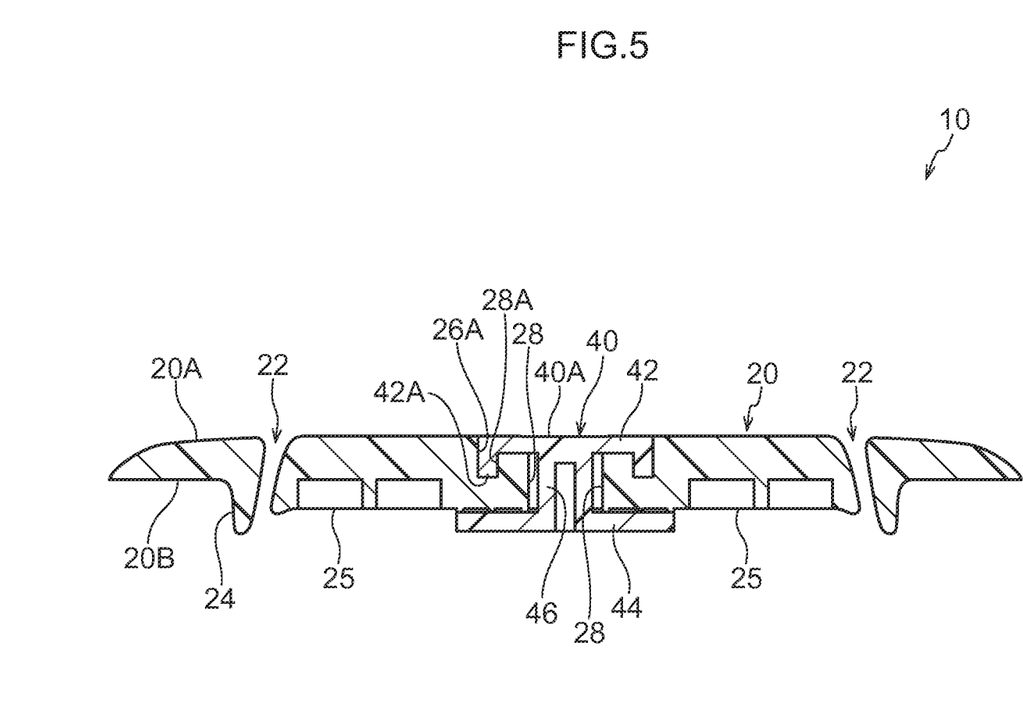
FIG. 5 is a cross-section taken along line A-A in FIG. 2.

As illustrated in FIG. 2, the closing member 40 is a member that is fitted into the communication opening path 26 and assembled to the bezel main body 20. As illustrated in FIG. 3 and FIG. 5, the closing member 40 includes a closing main body 42, lower clamping portions 44, and coupling portions 46. The closing main body 42 is formed along the communication opening path 26 in plan view, a front face 40A thereof is disposed so as to be in the same plane as the front face 20A of the bezel main body 20. As illustrated in FIG. 5, clamping protrusion portions 42A that project out from a back face of the closing main body 42 are formed to width direction end portions of the closing main body 42. The clamping protrusion portions 42A fit into the main body recessed portions 28A, and the closing main body 42 abuts upper faces of the main body receiving portions 28. A step portion 42B is formed to an end portion at the opening end portion 26B side of the closing main body 42. The thickness of the closing main body 42 becomes thicker at the step portion 42B.

The lower clamping portions 44 are formed at the opposite side of the closing member 40 to the closing main body 42, with the main body receiving portions 28 interposed therebetween. The lower clamping portions 44 each have a flat plate shape, and abut lower faces of the main body receiving portions 28. The main body receiving portions 28 are clamped between the closing main body 42 and the lower clamping portions 44, serving as clamping portions. The coupling portions 46 are formed between the closing main body 42 and the lower clamping portions 44. The coupling portions 46 are disposed between the pair of main body receiving portions 28 that face each other along the communication opening path 26, and couple together the closing main body 42 and the lower clamping portions 44.

As illustrated in FIG. 4, coupling walls 47 are formed at the opening end portion 26B side of the coupling portion 46, and a restricting protrusion portion 48 is formed to each of the coupling walls 47. The hook portions 34B of the restricting members 34 engage with the coupling walls 47, anchoring the closing member 40 in the communication opening path 26. The restricting protrusion portions 48 project out from the coupling walls 47 toward the opening end portion 26B side, and abut the inner wall 52A of an opening 52 of the retainer 50, described below.

Figure 6:
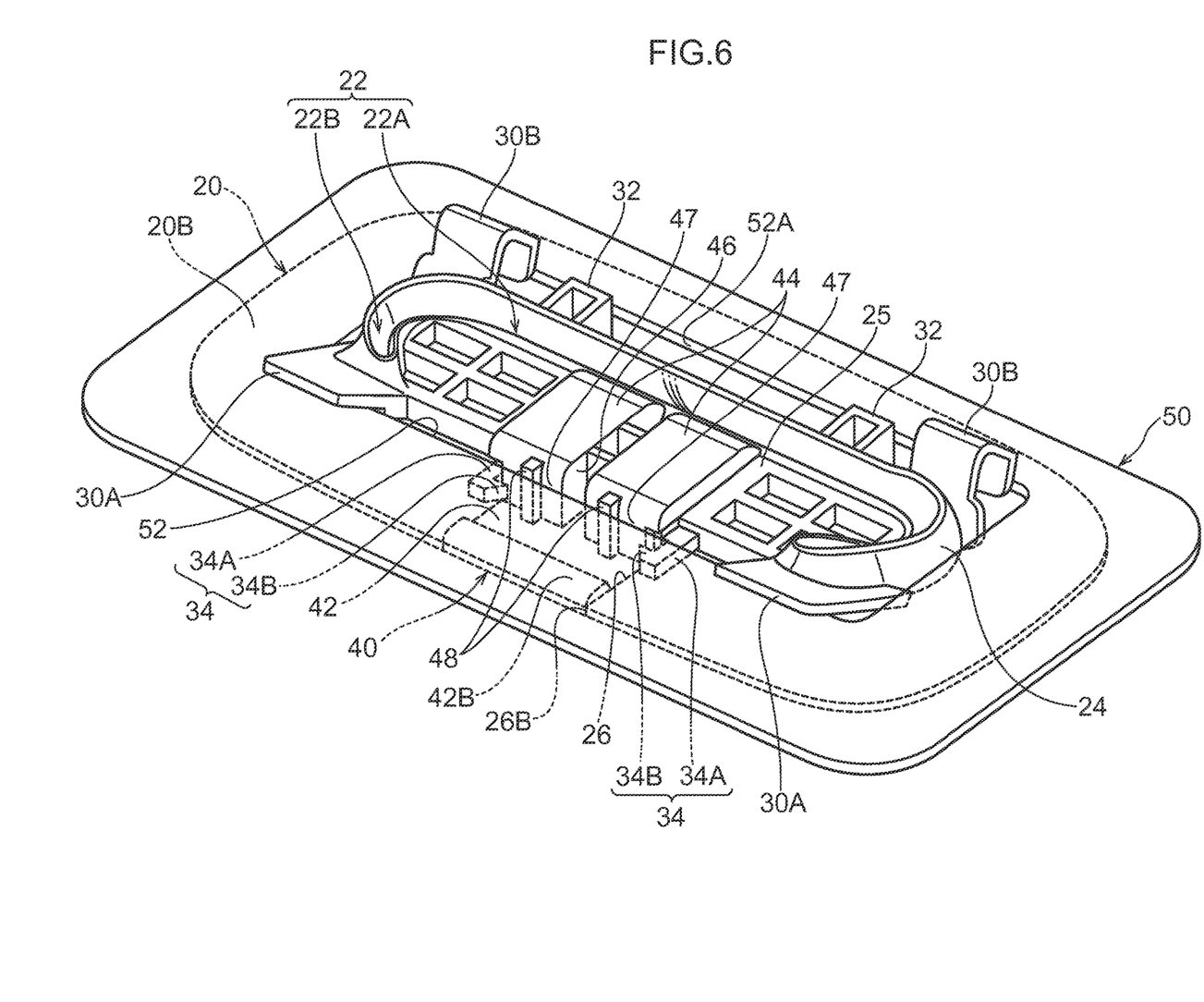
FIG. 6 is a perspective view illustrating a state in which a seatbelt device bezel according to an exemplary embodiment of the present invention is attached to a retainer, viewed from a back side.

As illustrated in FIG. 2, the retainer 50 has a flat plate shape, and is formed with the opening 52. The retainer 50 is attached to a vehicle seat or the like, not illustrated in FIG. 2. As illustrated in FIG. 6, in a state in which the closing member 40 is assembled to the bezel main body 20 of the bezel 10, the engaging tabs 30A and the engaging hook portions 30B are each inserted through the opening 52. Base end portions of the engaging tabs 30A engage with the inner wall 52A of the retainer 50 running along the opening 52, and the engaging hook portions 30B resiliently engage with the inner wall 52A of the retainer 50. The restricting protrusion portions 48 abut the inner wall 52A of the opening 52 of the retainer 50 from the outside of the opening end portion 26B. The closing member 40 is thereby prevented from detaching from the communication opening path 26.

Explanation follows regarding operation and advantageous effects of the present exemplary embodiment.

During insertion of the webbing 12 through the webbing pass-through portion 22, the webbing 12 is inserted through the communication opening path 26 and moved toward the webbing pass-through portion 22 in a state in which the closing member 40 is detached. The closing member 40 is then attached to the communication opening path 26 from the opening end portion 26B side. When this is performed, the main body receiving portions 28 are clamped between the closing main body 42 and the lower clamping portions 44, and the closing member 40 is moved toward the webbing pass-through portion 22 side while fitting the clamping protrusion portions 42A into the main body recessed portions 28A. The communication opening path 26 is thereby closed off by the closing member 40.

The bezel 10 is then attached to the retainer 50. When this is performed, the engaging tabs 30A and the engaging hook portions 30B are each inserted through the opening 52, the engaging tabs 30A are engaged with the inner wall 52A of the opening 52 of the retainer 50, and the engaging hook portions 30B are resiliently engaged with the inner wall 52A of the retainer 50. The inner wall 52A of the retainer 50 is made to abut the restricting protrusion portions 48 from the outside of the opening end portion 26B.

Figure 7:
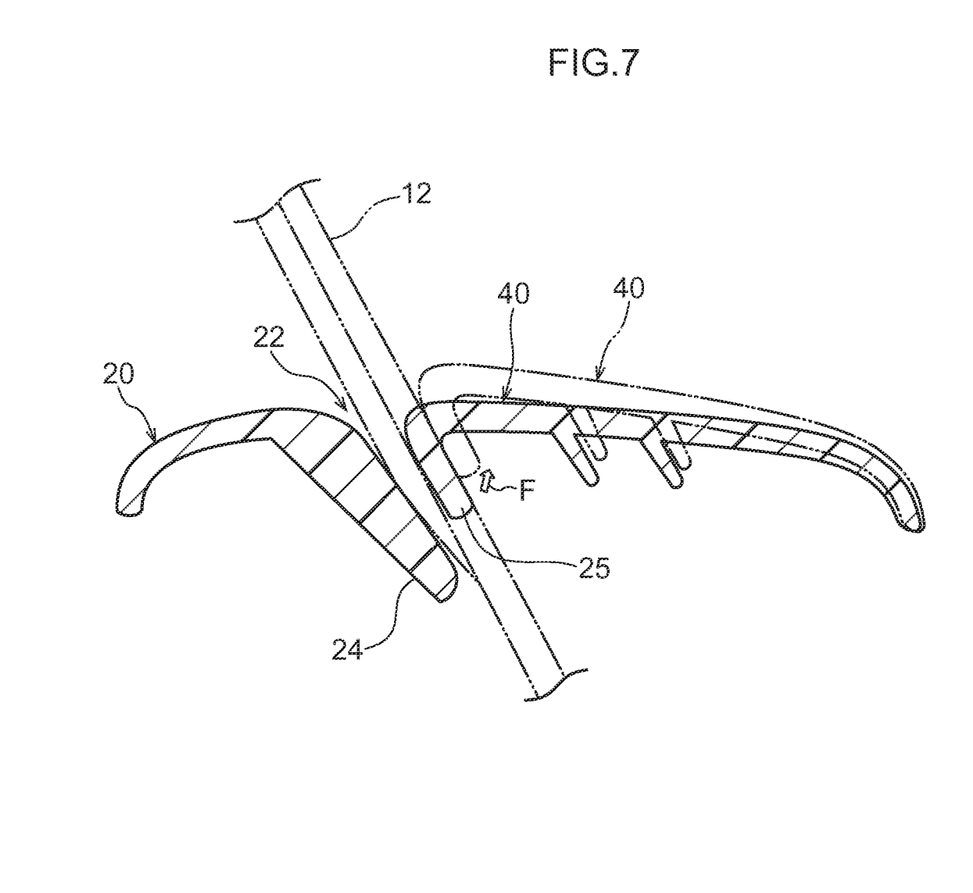
FIG. 7 is a cross-section illustrating an envisaged deformed state in a case in which load is applied to a webbing pass-through portion by webbing.

In the bezel 10 of the present exemplary embodiment, the main body receiving portions 28 that are integrally formed to the bezel main body 20 are clamped at one side and the other side in the pass-through direction of the webbing 12 by the closing main body 42 and the lower clamping portions 44 of the closing member 40. A coupling portion between the closing member 40 including the clamping portions, and the bezel main body 20, thereby has increased rigidity in the pass-through direction of the webbing 12. Thus, as illustrated in FIG. 7, even when the webbing 12 attempts to pass through the webbing pass-through portion 22 in a folded state and load in the arrow F direction acts on the webbing pass-through portion 22, the closing member 40 is suppressed from moving as illustrated by the double-dotted dashed line, and the webbing pass-through portion 22 is less liable to widen. This enables the webbing 12 to be suppressed from passing through the webbing pass-through portion 22 in the folded state.

In the bezel 10 of the present exemplary embodiment, the clamping protrusion portions 42A of the closing member 40 are fitted into the main body recessed portions 28A of the bezel main body 20. The closing main body 42 and the main body receiving portions 28 are thereby restricted from relative movement in separate directions from each other along the extension direction of the webbing pass-through portion 22. This enables the webbing pass-through portion 22 to be suppressed from widening due to relative movement between the closing member 40 and the bezel main body 20.

In the bezel 10 of the present exemplary embodiment, the closing main body 42 and the lower clamping portions 44 are coupled together by the coupling portions 46. The rigidity of the closing member 40 is thereby increased, enabling the webbing pass-through portion 22 to be made less liable to widen, even when load is applied to the webbing pass-through portion 22.

In the bezel 10 of the present exemplary embodiment, the closing member 40 is attached to the communication opening path 26 by moving the closing member 40 along the length direction of the communication opening path 26. Setting the movement direction of the closing member 40 in this manner enables sufficient overlap in a plan view of the main body receiving portions 28 and the lower clamping portions 44. This enables the coupling portion between the bezel main body 20 and the closing member 40 to be easily strengthened.

After attaching the bezel 10 to the retainer 50, the restricting protrusion portions 48 of the closing member 40 abut the retainer 50 from the opening end portion 26B side of the communication opening path 26, and are clamped between the retainer 50 and the bezel main body 20. As illustrated in FIG. 7, this enables the closing member 40 to be prevented or suppressed from detaching from the communication opening path 26, even when load in the arrow F direction is applied to the webbing pass-through portion 22.

Note that in the present exemplary embodiment, an example has been explained in which the bezel 10 of the present invention is applied to the seatbelt device 14 provided at the rear of the rear seat 60; however, a bezel of the present invention may be applied to a seatbelt device provided at another position. Application may be made, for example, to a seat other than a rear seat, such as a front seat.

What is claimed is:

1. A seatbelt device bezel, comprising:
   a bezel main body that includes a slit-shaped webbing pass-through passage through which a webbing of a seatbelt device is passed;
   a communication opening path in the bezel main body, that communicates with the webbing pass-through passage, and that extends along a direction intersecting the webbing pass-through passage and opens at an outer edge of the bezel main body;
   a main body receiving portion that is disposed at both width direction sides of the communication opening path and that is integrally formed with the bezel main body; and
   a closing member that is mounted at the communication opening path and closes off the communication opening path, and that includes a clamping portion that clamps the main body receiving portion from one side and from another side in a webbing pass-through direction,
   wherein at least a portion of the closing member is disposed in the communication opening path when the closing member is mounted to the bezel main body.

2. The seatbelt device bezel of claim 1, wherein:
   the clamping portion includes a clamping protrusion portion having a shape that protrudes in the webbing pass-through direction; and
   the main body receiving portion includes a main body recessed portion into which the clamping protrusion portion is fitted.

3. The seatbelt device bezel of claim 1, wherein the one side and the another side of the clamping portion are coupled together by a coupling portion disposed in the communication opening path.

4. The seatbelt device bezel of claim 1, wherein the closing member is movable from the outer edge of the bezel main body along an extension direction of the communication opening path.

5. The seatbelt device bezel of claim 1, wherein, in an attached state of the closing member to the bezel main body, the closing member is abutted from an opening side of the communication opening path by a retainer that retains the bezel main body, and the closing member is clamped between the retainer and the bezel main body.

6. The seatbelt device bezel of claim 1, wherein the main body receiving portion extends into the communication opening path from both of the width direction sides of the communication opening path.

7. A seatbelt device bezel, comprising:
   a bezel main body that includes a slit-shaped webbing pass-through passage through which a webbing of a seatbelt device is passed;
   a communication opening path in the bezel main body, that communicates with the webbing pass-through passage, and that extends along a direction intersecting the webbing pass-through passage and opens at an outer edge of the bezel main body;
   a main body receiving portion that is disposed at both width direction sides of the communication opening path and that is integrally formed with the bezel main body; and
   a closing member that is mounted at the communication opening path and closes off the communication opening path, and that includes a clamping portion that clamps the main body receiving portion from one side and from another side in a webbing pass-through direction,
   wherein the one side and the another side of the clamping portion are coupled together by a coupling portion disposed in the communication opening path.

8. A seatbelt device bezel, comprising:
   a bezel main body that includes a slit-shaped webbing pass-through passage through which a webbing of a seatbelt device is passed;
   a communication opening path in the bezel main body, that communicates with the webbing pass-through passage, and that extends along a direction intersecting the webbing pass-through passage and opens at an outer edge of the bezel main body;
   a main body receiving portion that is disposed at both width direction sides of the communication opening path and that is integrally formed with the bezel main body; and
   a closing member that is mounted at the communication opening path and closes off the communication opening path, and that includes a clamping portion that clamps the main body receiving portion from one side and from another side in a webbing pass-through direction,
   wherein, in an attached state of the closing member to the bezel main body, the closing member is abutted from an opening side of the communication opening path by a retainer that retains the bezel main body, and the closing member is clamped between the retainer and the bezel main body.

* * * * *